(12) United States Patent
Nakazawa

(10) Patent No.: US 11,815,278 B2
(45) Date of Patent: Nov. 14, 2023

(54) AIR CONDITIONING APPARATUS AND AIR CONDITIONING METHOD AND NEUTRALIZING VIRUS AND BACTERIA IN A ROOM

(71) Applicant: Synca-Outfit NQ co., Ltd., Tokyo (JP)

(72) Inventor: Hideta Nakazawa, Tokyo (JP)

(73) Assignee: SYNCA GROUP, LTD., Tokyo (JP)

( * ) Notice: Subject to any disclaimer, the term of this patent is extended or adjusted under 35 U.S.C. 154(b) by 375 days.

(21) Appl. No.: 17/159,413

(22) Filed: Jan. 27, 2021

(65) Prior Publication Data

US 2021/0381716 A1 Dec. 9, 2021

(30) Foreign Application Priority Data

Jun. 5, 2020 (JP) .................................. 2020-098317

(51) Int. Cl.
*F24F 11/76* (2018.01)
*F24F 8/24* (2021.01)
*F24F 110/30* (2018.01)

(52) U.S. Cl.
CPC ................ *F24F 11/76* (2018.01); *F24F 8/24* (2021.01); *F24F 2110/30* (2018.01)

(58) Field of Classification Search
CPC ........... F24F 11/76; F24F 8/24; F24F 2110/30
USPC ........................................................ 700/276
See application file for complete search history.

(56) References Cited

U.S. PATENT DOCUMENTS

| | | | | |
|---|---|---|---|---|
| 2006/0104858 A1* | 5/2006 | Potember | ................... | F24F 8/26 422/123 |
| 2010/0163633 A1* | 7/2010 | Barrett | ................... | F24F 13/082 236/51 |
| 2013/0154839 A1* | 6/2013 | Barton | ................... | F24F 12/001 340/584 |
| 2015/0060012 A1* | 3/2015 | Kamitani | .............. | F04B 43/046 165/59 |
| 2015/0369503 A1* | 12/2015 | Flaherty | ................... | F24F 11/62 700/277 |
| 2018/0023837 A1* | 1/2018 | Kraft | ................... | H04L 41/0883 700/276 |

FOREIGN PATENT DOCUMENTS

JP H06221612 8/1994

* cited by examiner

*Primary Examiner* — Md Azad
(74) *Attorney, Agent, or Firm* — Ryan Alley IP

(57) ABSTRACT

An air conditioning apparatus includes an air vacuum pump that sucks in air from a prescribed space to place the space under negative pressure, a first hot and cool air tank that contains the sucked air, first valves that adjust the flow rate of air supplied to or discharged from the first hot and cool air tank, a second hot and cool air tank that contains the sucked air while an air flow from the air vacuum pump to the first hot and cool air tank is restricted, second valves that adjust the flow rate of air supplied to or discharged from the second hot and cool air tank, and a heating and cooling device that manages the temperature of at least one of the first and second hot and cool air tanks to which an air flow from the air vacuum pump is restricted.

3 Claims, 2 Drawing Sheets

AIR CONDITIONING APPARATUS AND AIR CONDITIONING METHOD AND NEUTRALIZING VIRUS AND BACTERIA IN A ROOM

RELATED APPLICATIONS

This application claims priority under 35 U.S.C. § 119 to co-pending JP Application 2020-098317, filed Jun. 5, 2020, which is incorporated by reference herein in its entirety.

FIELD

The embodiment discussed herein relates to an air conditioning apparatus and an air conditioning method.

BACKGROUND

An apparatus for controlling the air condition in living space has been known. For example, there has been known a structure of air conditioning equipment that includes a comfort detection and determination means capable of detecting the comfort of a room and a people counter means capable of detecting the number of people in the room, and that is provided with an air conditioning mechanism of freely circulating air conditioned according to the comfort detected by the comfort detection and determination means and is also provided with an air outlet that is open on the floor of the room. The air conditioning mechanism is provided to circulate the conditioned air or stops the air circulation according to the number of people in the room, detected by the people counter means, and the air outlet is provided to blow the conditioned air that is circulated within the room by the air conditioning mechanism.

Please see, for example, Japanese Laid-open Patent Publication No. 6-221612.

To prevent the infection of coronavirus that has been spreading worldwide, most countries in the world recommend avoiding three Cs (closed spaces, crowded conditions, and close-contact settings).

As long as people do their work in indoor facility (hereinafter, referred to as "room"), it is difficult for them to avoid the three Cs, irrespective of whether the work is administrative work, service work, or production work.

Especially, in existing air conditioning systems, an air outlet for hot and cool air is located on or close to a ceiling, and when hot or cool air starts to blow in a room, the room is pressurized and so is under higher pressure than its surroundings. Therefore, droplets of virus and bacteria (hereinafter, referred to as pathogens) expelled from people's breathing in the room disperse into the hot or cool air flow and spread into every corner of the room.

In order to avoid the three Cs, it would be a quick way to open windows and doors to create air flow so as to remove pathogens from a room. This way, however, has a problem in that it is difficult to keep comfortable temperature in the room during mid-summer and mid-winter.

SUMMARY

According to one aspect, there is provided an air conditioning apparatus including: an air vacuum unit that sucks in air from a prescribed space to place the prescribed space under negative pressure; a first reservoir that contains the air sucked in by the air vacuum unit; a first adjustment unit that adjusts a flow rate of air supplied to and discharged from the first reservoir; a second reservoir that contains the air sucked in by the air vacuum unit while a flow of the air from the air vacuum unit to the first reservoir is restricted; a second adjustment unit that adjusts a flow rate of air supplied to and discharged from the second reservoir; and a heating and cooling device that manages a temperature of at least one of the first reservoir and the second reservoir upon determining that a flow of the air from the air vacuum unit to the at least one of the first reservoir and the second reservoir is restricted.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION

Figure 1:
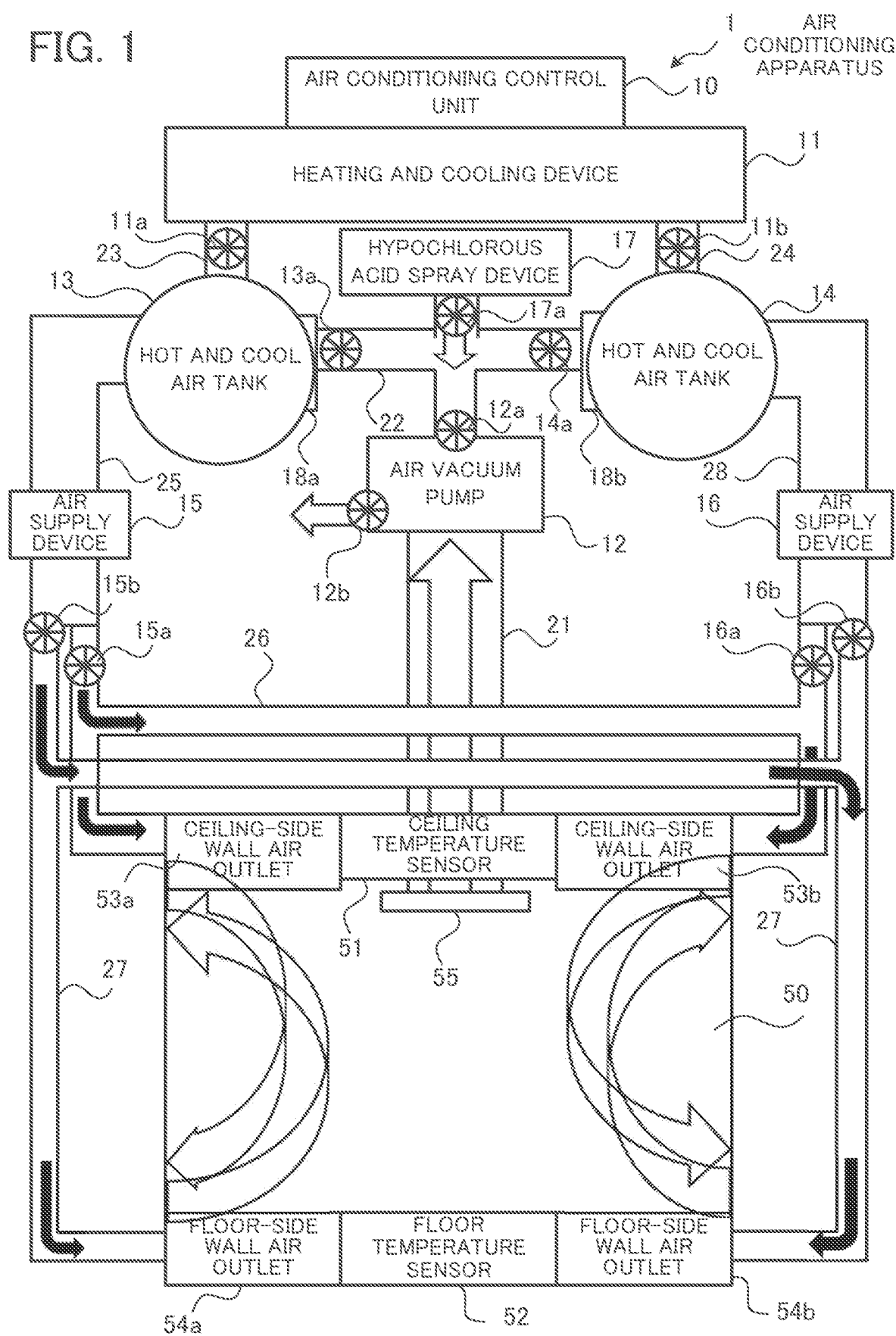
FIG. 1 illustrates an air conditioning apparatus according to one embodiment.

Hereinafter, an air conditioning apparatus according to one embodiment will be described in detail with reference to the accompanying drawings.

For easy understanding of the embodiment, the position, size, shape, range, and others of each component illustrated in the drawings may not represent the actual position, size, shape, range, and others. Therefore, the embodiment is not limited to the illustrated positions, sizes, shapes, ranges, and others.

Elements that are each expressed in a singular form in the embodiment may be plural in use, expect otherwise particularly specified in writing.

Embodiment

FIG. 1 illustrates an air conditioning apparatus according to one embodiment.

The air conditioning apparatus 1 of this embodiment controls the air condition in a room (prescribed space) 50. The room 50 is provided with a ceiling temperature sensor 51, a floor temperature sensor 52, ceiling-side wall air outlets 53a and 53b, and floor-side wall air outlets 54a and 54b.

The ceiling temperature sensor 51 detects the temperature around the ceiling of the room 50. The floor temperature sensor 52 detects the temperature around the floor of the room 50.

The ceiling-side wall air outlets 53a and 53b are air outlets that are provided in the vicinity of the ceiling of the room 50 and blow cool air discharged from the air conditioning apparatus 1.

The floor-side wall air outlets 54a and 54b are air outlets that are provided in the vicinity of the floor of the room 50 and blow hot air discharged from the air conditioning apparatus 1. In this connection, the number of ceiling-side wall air outlets 53a and 53b and the number of floor-side wall air outlets 54a and 54b are not limited to the illustrated example.

The room 50 is also provided with a grille (a lattice metal plate used at an air inlet) 55.

The air conditioning apparatus 1 includes an air conditioning control unit 10, a heating and cooling device 11, an air vacuum pump (air vacuum unit) 12, a hot and cool air tank (first reservoir) 13, a hot and cool air tank (second reservoir) 14, air supply devices 15 and 16, and a hypochlorous acid spray device 17. The air conditioning control unit 10 is an artificial intelligence (AI) air conditioning controller, for example. The air conditioning control unit 10 controls the entire air conditioning apparats 1 (heating and cooling device 11, air vacuum pump 12, air supply devices 15 and 16, various sensors, and others).

Figure 2:
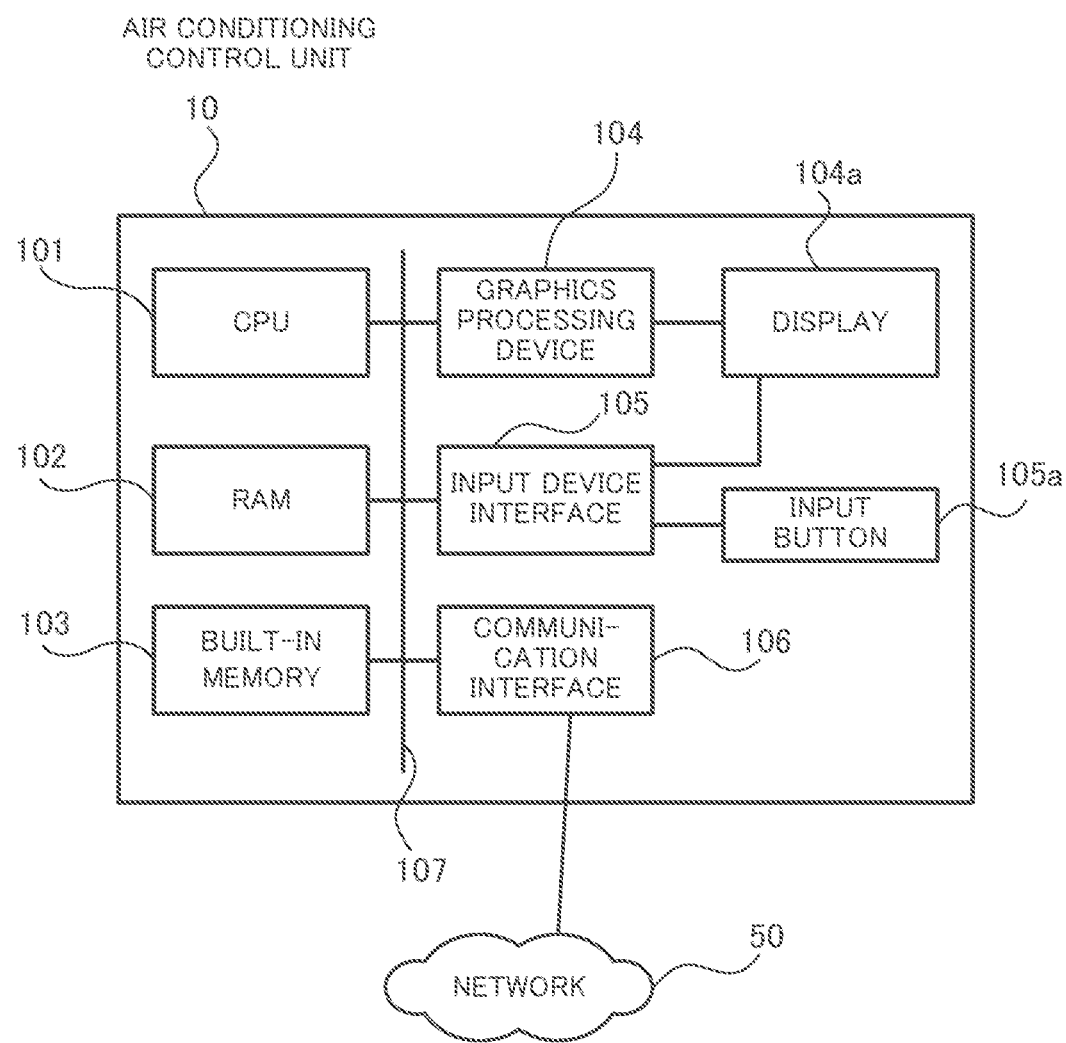
FIG. 2 illustrates the hardware configuration of an air conditioning control unit according to the embodiment.

FIG. 2 illustrates the hardware configuration of an air conditioning control unit according to the embodiment.

The air conditioning control unit 10 is entirely controlled by a central processing unit (CPU) 101.

A random access memory (RAM) 102 and a plurality of peripheral devices are connected to the CPU 101 via a bus 107.

The RAM 102 is used as a main storage device of the air conditioning control unit 10. The RAM 102 temporarily stores therein at least part of operating system (OS) programs and application programs that are executed by the CPU 101. In addition, the RAM 102 stores therein various kinds of data to be used by the CPU 101 in processing.

Connected to the bus 107 are a built-in memory 103, a graphics processing device 104, an input device interface 105, a communication interface 106.

The built-in memory 103 performs data write and read. The built-in memory 103 is used as an auxiliary storage device of the air conditioning control unit 10. The built-in memory 103 stores therein OS programs, application programs, and various kinds of data. Examples of the built-in memory include semiconductor storage devices such as flash memories.

A display 104a is connected to the graphics processing device 104. The graphics processing device 104 displays images on the screen of the display 104a in accordance with instructions from the CPU 101. Examples of the display 104a include liquid crystal displays and others. In addition, the display 104a has a touch panel function.

The display 104a and an input button 105a are connected to the input device interface 105. The input device interface 105 gives signals received from the input button 105a and the touch panel of the display 104a to the CPU 101.

The communication interface 106 is connected to a network 50. The communication interface 106 communicates data with other computers and communication devices over the network 50. In addition, the communication interface 106 is able to obtain information from various sensors provided in the air conditioning apparatus 1 with one or both of wireless communication and wired communication.

With the above hardware configuration, the processing functions of the present embodiment are implemented. Refer now back to FIG. 1 again.

The air vacuum pump 12 sucks in air from the room 50 through the grille 55 provided in the room 50 and an air vacuum duct 21, to thereby place the room 50 under negative pressure. The air vacuum pump 12 has a meter that measures the volume of the sucked air. In addition, the air vacuum pump 12 is provided with valves 12a and 12b. Examples of the valves 12a and 12b include air chuck valves. The same applies to the other valves in this description.

The air vacuum pump 12 pressurizes the sucked air and discharges it to the hot and cool air tanks 13 and 14 through a duct 22. A valve 13a is provided in the duct 22 between the air vacuum pump 12 and the hot and cool air tank 13. A valve 14a is provided in the duct 22 between the air vacuum pump 12 and the hot and cool air tank 14.

The hot and cool air tanks 13 and 14 contain compressed air discharged by the air vacuum pump 12.

The relationship between the size and the pressure resistant of the hot and cool air tanks 13 and 14 is as follows.

Assuming that the room 50 has a floor space of 33 m2 and a ceiling height of 2.5 m, the volume of the room 50 is calculated as 82.5 m3. One atmospheric pressure is approximately 0.1 Mpa. Assuming that the hot and cool air tank 13 has a radius of 0.5 m, the volume of the hot and cool air tank 13 is calculated as approximately 0.532 m3. 82.5 m3/0.532 m3@15.5 Mpa is obtained. For example, in the case where a 70 MPa tank, which is used for a hydrogen car, has a diameter of 1 m, it is possible to heat and cool a room of approximately 150 m3.

The heating and cooling device 11 sends hot or cool air to the hot and cool air tanks 13 and 14 through ducts 23 and 24 in accordance with instructions from the air conditioning control unit 10. A valve 11a is provided between the heating and cooling device 11 and the hot and cool air tank 13. A valve 11b is provided between the heating and cooling device 11 and the hot and cool air tank 14.

The air supply device 15 blows cool air coming from the hot and cool air tank 13 through a duct 25, from the ceiling-side wall air outlets 53a and 53b through a cool air duct 26. A valve 15a is provided between the air supply device 15 and the cool air duct 26. In addition, the air supply device 15 blows hot air coming from the hot and cool air tank 13 through the duct 25, from the floor-side wall air outlets 54a and 54b through a hot air duct 27. A valve 15b is provided between the air supply device 15 and the hot air duct 27.

The air supply device 16 blows cool air coming from the hot and cool air tank 14 through a duct 28, from the ceiling-side wall outlets 53a and 53b through the cool air duct 26. A valve 16a is provided between the air supply device 16 and the cool air duct 26. In addition, the air supply device 16 blows hot air coming from the hot and cool air tank 14 through the duct 28, from the floor-side wall air outlets 54a and 54b through the hot air duct 27. A valve 16b is provided between the air supply device 16 and the hot air duct 27.

The hypochlorous acid spray device 17 sprays hypochlorous acid to the duct 22. In this connection, the hypochlorous acid spray device 17 is an example of a device for disinfecting and sterilizing virus in the air. Disinfectant for the spray is not limited to hypochlorous acid. A valve 17a is provided between the hypochlorous acid spray device 17 and the duct 22. In addition, a filter 18a is disposed at the input stage of the hot and cool air tank 13. In addition, a filter 18b is disposed at the input stage of the hot and cool air tank 14. The filters 18a and 18b block both hypochlorous acid molecules remaining in the duct 22 and chlorine odor generated at the time of decomposition.

In this connection, the valves 13a, 15a, and 15b are examples of a first adjustment unit for adjusting the flow rate of air supplied to or discharged from the hot and cool air tank 13. The valves 14a, 16a, and 16b are examples of a second adjustment unit for adjusting the flow rate of air supplied to or discharged from the hot and cool air tank 14.

The following describes how the air conditioning apparatus operates (processes). First, the operating state of the left half of FIG. 1 will be described step by step. In the following description, step numbers are given for convenience of explanation.

(Step S0) The valves 12a, 13a, and 17a are open when the air conditioning apparatus 1 starts up. The other valves (valves 11a, 11b, 12b, 14a, 15a, 16a and 16b) are all closed.

(Step S1) The air conditioning control unit 10 operates the air vacuum pump 12. The air vacuum pump 12 sucks in air from the room 50 via the grille 55 provided in the vicinity of the ceiling and the air vacuum duct 21.

At this time, the air conditioning control unit 10 determines based on the temperatures detected by the ceiling temperature sensor 51 and floor temperature sensor 52 whether to operate the heating and cooling device 11. For example, in the case where the temperatures detected by the ceiling temperature sensor 51 and floor temperature sensor 52 fall in a preset range of temperature (for example, a range of 20° C. to 24° C. (humidity of 40% to 60%) during the winter season, and a range of 25° C. to 27° C. (humidity of 50% to 60%) during the summer season), the air conditioning control unit 10 determines not to operate the heating and cooling device 11. When determining not to operate the heating and cooling device 11, the air conditioning control unit 10 opens the valve 12b to exhaust the air of the room 50 to maintain the room in a reduced pressure state. When determining to operate the heating and cooling device 11, the process proceeds to the following step S2.

(Step S2) Since the air vacuum pump 12 is a booster pump as described earlier, the pressurized air passes through the spray duct 22. Pathogens in the air are deactivated by the hypochlorous acid water sprayed by the hypochlorous acid spray device 17, and then the air is sent to the hot and cool air tank 13 via the valve 13a that is open.

(Step S3) The air conditioning control unit 10 determines whether a prescribed amount of compressed air is contained in the hot and cool air tank 13 and duct 25 (hereinafter, referred to as "CHTD1"), with reference to the value indicated by the meter provided in the air vacuum pump 12. If the CHTD1 contains the prescribed amount of compressed air, the air conditioning control unit 10 closes the valves 12a, 13a, and 17a and opens the valve 11a. Then, the heating and cooling device 11 operates to start the cooling or heating of the CHTD1.

(Step S4) Almost at the same time as step S3, the right half of FIG. 1 starts to operate. More specifically, the air conditioning apparatus 1 opens the valves 12a, 14a, and 17a. The following steps S5 to S7 are almost the same as steps S1 to S3.

(Step S5) The air conditioning control unit 10 operates the air vacuum pump 12. The air vacuum pump 12 sucks in air from the room 50, from the grille 55 provided in the vicinity of the ceiling via the air vacuum duct 21.

At this time, the air conditioning control unit 10 determines based on the temperatures detected by the ceiling temperature sensor 51 and floor temperature sensor 52 whether to operate the heating and cooling device 11. When determining not to operate the heating and cooling device 11, the air conditioning control unit 10 opens the valve 12b to exhaust the air of the room 50 to maintain the room in a reduced pressure state. When determining to operate the heating and cooling device 11, the process proceeds to the following step S6.

(Step S6) Since the air vacuum pump 12 is a booster pump as described earlier, the pressurized air passes through the spray duct 22. Pathogens in the air are deactivated by the hypochlorous acid water sprayed by the hypochlorous acid spray device 17, and then the air is sent to the hot and cool air tank 14 via the valve 14a that is open.

(Step S7) The air conditioning control unit 10 determines whether a prescribed amount of compressed air is contained in the hot and cool air tank 14 and duct 28 (hereinafter, referred to as "CHTD2"), with reference to the value indicated by the meter provided in the air vacuum pump 12. If the CHTD2 contains the prescribed amount of compressed air, the air conditioning control unit 10 closes the valves 12a, 14a, and 17a and opens the valve 11b. Then, the heating and cooling device 11 operates to start the cooling or heating of the CHTD2.

By the way, when the CHTD1 reaches a prescribed temperature, the air conditioning control unit 10 executes step S8 and subsequence steps.

(Step S8) When the CHTD1 reaches the prescribed temperature, the air conditioning control unit 10 closes the valve 11a. If the air discharged from the heating and cooling device 11 to the hot and cool air tank 13 is cool air, the air conditioning control unit 10 opens the valve 15a. If the air discharged from the heating and cooling device 11 to the hot and cool air tank 13 is hot air, the air conditioning control unit 10 opens the valve 15b.

The air supply device 15 sends the hot or cool air to the room 50. At the same time, the air supply device 15 measures the amount of the hot or cool air. The air conditioning control unit 10 continues to manage the discharged amounts of the air vacuum pump 12 and air supply device 15 so that the room has one atmospheric pressure or lower.

By the way, before the CHTD1 runs out of the compressed air, the air conditioning control unit 10 controls the heating and cooling device 11 so that the compressed air in the CHTD2 reaches the prescribed temperature. When the CHTD1 is about to run out of the compressed air, the air conditioning control unit 10 executes step S9 and subsequent steps.

(Step S9) The air conditioning control unit 10 closes the valve 11b. If the air discharged from the heating and cooling device 11 to the hot and cool air tank 14 is cool air, the air conditioning control unit 10 opens the valve 16a. If the air discharged from the heating and cooling device 11 to the hot and cool air tank 14 is hot air, the air conditioning control unit 10 opens the valve 16b. In addition, the air conditioning control unit 10 opens the valves 12a, 13a, and 17a. Thereby, the air sucked in from the room 50 passes through the spray duct 22. Pathogens in the air are deactivated by the hypochlorous acid water sprayed by the hypochlorous acid spray device 17, and then the air is sent to the hot and cool air tank 13 via the valve 13a that is open.

(Step S10) Before the CHTD2 runs out of the compressed air, the air conditioning control unit 10 controls the heating and cooling device 11 so that the compressed air in the CHTD1 reaches the prescribed temperature. Until the temperature of the room 50 reaches the preset temperature, the air conditioning control unit 10 repeats steps S1 to S9, which include containing compressed air in the hot and cool air tanks 13 and 14 alternately, carrying out temperature management, and operating the air supply devices 15 and 16 to discharge air from the cool air duct 26 or hot air duct 27. After that, until the room temperature goes above or below the set temperature, the air conditioning control unit 10 operates the air vacuum pump 12 and opens the valve 12b. By doing so, the air sucked in from the room 50 is exhausted to the outside.

In the way described above, the air conditioning control unit 10 is able to heat and cool the room 50 by managing the air vacuum pump 12, air supply devices 15 and 16, and all valves while maintaining the room 50 at a prescribed atmospheric pressure less than or equal to one atmospheric pressure.

Note that, without two hot and cool air tanks, namely the hot and cool air tanks 13 and 14, it is very difficult to keep the room 50 in a reduced pressure state.

When the air in the hot and cool air tank 13 has been sterilized using the hypochlorous acid water and is sufficiently cooled or heated, the air is sent from the air supply device 15 to the room 50 through the cool air duct 26 or hot air duct 27.

On the other hand, the air from the room 50 is discharged to and sufficiently contained in the hot and cool air tank 14.

In this state, if the following inequality is not satisfied, "pressure in the hot and cool air tank 13<the pressure in the hot and cool air tank 14," that is, if the pressure in the hot and cool air tank 14 is not higher than the pressure in the hot and cool air tank 13, it is not possible to keep the room 50 under negative pressure.

In addition, after hot or cool air in the hot and cool air tank 13 is sent to the room 50 and thus no air remains in the hot and cool air tank 13, the air sucked from the room 50 is contained in the hot and cool air tank 13. When the air sucked from the room 50 is sufficiently contained in the hot and cool air tank 13, the air is then sterilized using the hypochlorous acid water and is heated or cooled by the heating and cooling device 11.

In this state, the following inequality needs to be satisfied: "pressure in the hot and cool air tank 13>the pressure in the hot and cool air tank 14." The same processing is repeated thereafter.

To maintain the two states: "pressure in the hot and cool air tank 13<pressure in the hot and cool air tank 14" and "pressure in the hot and cool air tank 13>pressure in the hot and cool air tank 14," the air conditioning control unit 10 controls the valves as described above to adjust pressure reduction. It is possible because their storage chambers are at high pressure.

That is, at least two hot and cool air tanks, namely the hot and cool air tanks 13 and 14, are provided to prepare two storage chambers for containing air, and the air supply devices 15 and 16 are provided respectively corresponding to the hot and cool air tanks 13 and 14, and the valves 15a and 15b and the valves 16a and 16b are respectively provided for the hot and cool air tanks 13 and 14.

As described above, the air conditioning apparatus 1 includes the air vacuum pump 12 for sucking in air from a prescribed space 50 to place the space 50 under negative pressure, the hot and cool air tank 13 for containing the air sucked in by the air vacuum pump 12, the valves 11a, 13a, 15a and 15b for adjusting the flow rate of air supplied to or discharged from the hot and cool air tank 13, the hot and cool air tank 14 for containing the air sucked in by the air vacuum pump 12 when a flow of air from the air vacuum pump 12 to the hot and cool air tank 13 is restricted, the valves 11b, 14a, 16a, and 16b for adjusting the flow rate of air supplied to or discharged from the hot and cool air tank 14, and the heating and cooling device 11 that manages the temperatures of the hot and cool air tank 13 and hot and cool air tank 14 when the flow of air from the air vacuum pump 12 thereto is restricted.

Therefore, by changing conventional pressure air conditioning to decompression air conditioning, it is possible to avoid the closed spaces and crowded conditions in the three Cs.

In addition, before heating and cooling, a little amount of hypochlorous acid water is sprayed to air sucked from a room. By doing so, it is possible to deactivate pathogens.

This air conditioning apparatus 1 is applicable to all kinds of rooms. It is applicable to not only houses and buildings but also closed spaces such as moving objects including cars, buses, and trains so as to reduce pathogen infection of living things including humans in the closed spaces.

In addition, conventional air conditioners cause uneven temperature in a room. With the heating and cooling circulation type, however, it is possible to provide even temperature. Therefore, so-called "keeping head cool and feet warm" is possible, which makes it possible to reduce burdens on human bodies.

The processes that are performed by the air conditioning control unit 10 may be performed by a plurality of apparatuses in a distributed manner.

Heretofore, the air conditioning apparatus has been described with respect to the embodiment illustrated. The embodiment is not limited thereto, and the components of each unit may be replaced with other components having equivalent functions. In addition, other desired configurations and steps may be added to the embodiment.

The above-described processing functions may be implemented by using a computer. In this case, a program is prepared, which describes processes for the functions of the air conditioning control unit 10. A computer implements the above-described processing functions by executing the program. The program describing the intended processes may be stored on a computer-readable storage medium. Computer-readable storage media include magnetic storage devices, optical discs, magneto-optical storage media, semiconductor memories, and others. The magnetic storage devices include hard disk drives, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is stored, may be put on sale. Alternatively, the program may be stored in the storage device of a server computer and may be transferred from the server computer to other computers over a network.

A computer which is to execute the above program stores in its local storage device the program recorded on a portable storage medium or transferred from the server computer, for example. Then, the computer reads the program from the local storage device, and runs the program. The computer may run the program directly from the portable storage medium. Also, while receiving the program being transferred from the server computer over a network, the computer may sequentially run this program.

In addition, the above-described processing functions may also be implemented wholly or partly by using a digital signal processor (DSP), an application-specific integrated circuit (ASIC), a programmable logic device (PLD), or other electronic circuits.

According to one aspect, it is possible to control the air condition in a room while removing pathogens from the room.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An air conditioning apparatus, comprising:
   an air vacuum unit that sucks in air from a prescribed space to place the prescribed space under negative pressure;
   a first reservoir that contains compressed air obtained by pressurizing the air from the air vacuum unit;
   a first adjustment unit that adjusts a flow rate of the compressed air supplied to and discharged from the first reservoir;
   a second reservoir that contains the compressed air from the air vacuum unit while a flow of the compressed air from the air vacuum unit to the first reservoir is restricted;
   a second adjustment unit that adjusts a flow rate of the compressed air supplied to and discharged from the second reservoir; and
   a heating and cooling device that manages a temperature of at least one of the first reservoir and the second reservoir upon determining that a flow of the compressed air from the air vacuum unit to the at least one of the first reservoir and the second reservoir is restricted, wherein,
   the first adjustment unit determines whether the compressed air is contained in a first prescribed amount in the first reservoir, and upon determining that the compressed air is contained in the first prescribed amount in the first reservoir, restricts the flow of the compressed air from the air vacuum unit to the first reservoir,
   the second adjustment unit determines whether the compressed air is contained in a second prescribed amount in the second reservoir, and upon determining that the compressed air is contained in the second prescribed amount in the second reservoir, restricts a flow of the compressed air from the air vacuum unit to the second reservoir, and
   the first reservoir contains the compressed air discharged by the air vacuum unit while the flow of the compressed air from the air vacuum unit to the second reservoir is restricted.

2. The air conditioning apparatus according to claim 1, further comprising a spray device that sprays hypochlorous acid to the air sucked in by the air vacuum unit.

3. An air conditioning management method, comprising:
   causing, by a computer, an air vacuum unit to suck air from a prescribed space to place the prescribed space under negative pressure;
   containing, by the computer, compressed air obtained by pressurizing the air from the air vacuum unit, in a first reservoir;
   adjusting, by the computer, a flow rate of the compressed air supplied to and discharged from the first reservoir, and containing the compressed air sucked from the prescribed space in a second reservoir while a flow of the compressed air from the air vacuum unit to the first reservoir is restricted;
   adjusting, by the computer, a flow rate of the compressed air supplied to and discharged from the second reservoir, and containing the compressed air sucked from the prescribed space in the first reservoir while a flow of the compressed air from the air vacuum unit to the second reservoir is restricted;
   managing, by the computer, a temperature of at least one of the first reservoir and the second reservoir upon determining that a flow of the compressed air from the air vacuum unit to the at least one of the first reservoir and the second reservoir is restricted;
   determining, by the computer, whether the compressed air is contained in a first prescribed amount in the first reservoir, and upon determining that the compressed air is contained in the first prescribed amount in the first reservoir, restricting the flow of the compressed air from the air vacuum unit to the first reservoir; and
   determining, by the computer, whether the compressed air is contained in a second prescribed amount in the second reservoir, and upon determining that the compressed air is contained in the second prescribed amount in the second reservoir, restricting the flow of the compressed air from the air vacuum unit to the second reservoir.

\* \* \* \* \*